PROJECTION SYSTEM AND METHOD

Filed Sept. 27, 1965 5 Sheets-Sheet 1

INVENTORS:
WILLIAM E. GOOD,
VON C. CAMPBELL,
BY [signature]
THEIR ATTORNEY

Nov. 5, 1968 V. C. CAMPBELL ET AL 3,409,735

PROJECTION SYSTEM AND METHOD

Filed Sept. 27, 1965 5 Sheets-Sheet 2

INVENTORS:
WILLIAM E. GOOD,
VON C. CAMPBELL,

BY Julius J. Zaskalicky
THEIR ATTORNEY.

PROJECTION SYSTEM AND METHOD

Filed Sept. 27, 1965 5 Sheets-Sheet 3

INVENTORS:
WILLIAM E. GOOD,
VON C. CAMPBELL,

BY Julius J. Zaskalicky
THEIR ATTORNEY.

INVENTORS:
WILLIAM E. GOOD,
VON C. CAMPBELL,

BY Julius J. Zaskalicky
THEIR ATTORNEY.

INVENTORS:
WILLIAM E. GOOD,
VON C. CAMPBELL,

BY [signature]
THEIR ATTORNEY.

United States Patent Office 3,409,735

Patented Nov. 5, 1968

3,409,735
PROJECTION SYSTEM AND METHOD

Von C. Campbell, Syracuse, and William E. Good, Liverpool, N.Y., assignors to General Electric Company, a corporation of New York Filed Sept. 27, 1965, Ser. No. 490,498
4 Claims. (Cl. 178—5.4)

ABSTRACT OF THE DISCLOSURE

Light valve projection apparatus using a fluid medium deformable by a scanning electron beam into a plurality of diffraction gratings, each for controlling the light of a respective color. One of the gratings utilizes the raster lines and has a line density considerably smaller than the other gratings with result that its light transmission efficiency is not comparable to the others. The density of the raster line grating is effectively doubled and made comparable to the other gratings by providing a double electron beam or equivalent.

The present invention relates to improvements in apparatus and method for the projection of images of the kind including a viscous light modulating medium deformable into diffraction gratings by electron charge deposited thereon in accordance with electrical signals corresponding to the images.

In one of its particular aspects the invention relates to the projection of color images using a common area of the viscous light modulating medium and a common electron beam for the production of deformations in the medium for simultaneously controlling the transmission therethrough point by point of the primary color components, in kind and intensity, in a beam of light in response to a plurality of simultaneous occurring electrical signals, each deformation corresponding point by point to the intensity of a respective primary color component of an image to be projected by such beam of light. Such systems provide a number of advantages over conventional systems in which the resultant light output is dependent on the energy in an electron beam and is a small percentage of the limited energy available in an electron beam.

One such system for controlling the intensity of a beam of light includes a viscous light modulating medium which is adapted to deviate each portion of the beam in accordance with deformations in a respective point thereof on which the portion is incident, and a light mask having a plurality of apertures therein disposed to mask the beam of light in the absence of any deformation in the light modulating medium and to pass light in accordance with the deformations in said medium. The intensity of the portions of the beam of light deviated by the light modulating medium and passed through the apertures of the light mask varies in accordance with the magnitude of deformations produced in the light modulating medium.

The light modulating medium may be a thin light transmissive layer of fluid in which the electron beam forms phase diffraction gratings having adjacent valleys spaced apart by a predetermined distance. Each portion of light incident on a respective small area or point of the medium is deviated in a direction orthogonal to the direction of the valleys. The intensity of the deviated light is a function of the depth of the valleys.

The phase diffraction grating may be formed in the layer of fluid by the deposition thereon of electrical charges, for example, by a beam of electrons. The beam may be directed on the medium and deflected along the surface thereof in one direction at successively spaced intervals perpendicular or orthogonal to the one direction. Concurrently the rate of deflection in the one direction may be altered periodically at a frequency considerably higher than the frequency of scan to produce alterations in the electrical charges deposited on the medium along the direction of scan. The concentrations of electrical charge in corresponding parts of each line of scan form lines of electrical charge which are attracted to a suitably disposed oppositely charged transparent conducting plate on the other surface of the layer thereby producing a series of valleys therein. As the periodic variations in the period of scan are changed in amplitude, the depth of the valleys are correspondingly changed. Thus, with such a means each element of a beam of light impinging on one of the opposite surfaces of the layer is deflected orthogonally to the direction of the valleys or lines therein by an amount determined by the spacing between adjacent valleys, and the intensity of an element of deflected light is a function of the depth of such valleys.

When a beam of white light, which is constituted of primary color components of light, is directed on a diffraction grating, light impinging therefrom is dispersed into a series of spectra on each side of a line representing the direction or path of undeviated light. The first pair of spectra on each side of the undeviated path of light is referred to as first order diffraction pattern. The next pair of spectra on each side of the undiffracted path is referred to as second order diffraction pattern, and so on. In each order of the complete spectrum the blue light is deviated the least, and the red light the most. The angle of deviation of red light in the first order light pattern, for example, is that angle measured with reference to the undeviated path at which the ratio of the wavelength of red light to the line to line spacings of the grating is equal to the sine of the deviation angle. The angle of deviation of the red light in the second order pattern is that angle at which the ratio of twice the wavelength of red light to the line to line spacing of the grating is equal to the sine of the angle, and so on.

If the beam of light is oblong in shape, each of the spectra is constituted of color components which are oblong in shape. If the diffracted light is directed onto a mask having a wide transparent slot appropriately located on the mask, the light passed through the slots is essentially reconstituted white light, each portion of which is of an intensity corresponding to the depth of the valleys illuminated by such portion. Such a system as described would be suitable for the projection of television images in black and white. The line to line spacing of the grating formed in each part of the light modulating medium is the same and determines the deviation of light under conditions of modulation. The depth of the valleys formed in each part of the light modulating medium varies in accordance with the amplitude of the modulating signal and determines the intensity of light in each deviated portion of the beam.

Systems have been proposed for the projection of three primary colors by a common viscous light modulating medium in which light deviating deformations are produced therein by a common electron beam modulated in various ways to produce a set of three diffraction gratings on the common media, each corresponding to a respective primary color component. The line to line spacing of each of the diffraction gratings are different thus producing a different angle of deviation for each of the primary color components. The depth of the deformation is varied in accordance with a respective primary color signal to produce corresponding variations in the intensity of light in the first, second and higher diffraction orders. The apertures in a light output mask are of predetermined extent and at locations to selectively pass the desired orders of primary color components of the diffraction spectrum. The line to line spacing of each of the three primary diffraction gratings determines the width and location of the cooperating slot to pass the respective primary color component when a diffraction grating corresponding to that color component is formed in the light modulating medium.

In the kind of system under consideration an electron beam is modulated by a plurality of carrier waves of fixed and different frequency each corresponding to a respective color component, the amplitude of each of which is modulated in accordance with an electrical signal corresponding to the intensity of the respective color component to form a plurality of diffraction gratings having valleys extending in the same direction, each grating having a different line to line spacing corresponding to a respective primary color component and the valleys thereof having an amplitude varying in accordance with the intensity of a respective primary color component. If the primary color components selected are blue, green and red, and the carrier frequency associated with each of these colors is proportionately lower, the deviation in the first order spectrum of the blue component of white light by the blue diffraction grating, and similarly the deviation of the green component by the green diffraction grating, and the deviation of the red component by the red diffraction grating, can be made to correspond quite closely. Accordingly, a pair of transparent slots placed in the light mask in position, relative to the undeviated path of light, corresponding to that deviation and of just sufficient orthogonal extent, pass all of the primary components. The intensity of each of the primary color components in the beam of light emerging from the mask would vary in accordance with the amplitude of a respective electrical signal corresponding to the respective color component. Projection of such a beam reconstitutes in color the image corresponding to the electrical signals.

In a modification of the system described above and to be considered in detail herein, one set of grating lines is formed perpendicular or orthogonal to the other sets of grating lines. In such a system light filters and focusing elements direct red and blue light from a source of white light through the light modulating medium onto appropriate opaque and transparent portions of the light output mask cooperatively associated with the red and blue diffraction gratings formed in the light modulating medium to produce the desired operation explained above and direct green light from the source of white light on the common area of the light modulating medium and onto appropriate opaque and transparent portions in the light output mask which are cooperatively associated with the green diffraction grating formed in the light modulating medium. A single electron beam of substantially constant current is directed onto the light modulating medium and is deflected horizontally and vertically over the active area of the light modulating medium to form a raster thereon. The three diffraction gratings are formed on the raster area by appropriate modulation of the electron beam. The red and blue diffraction gratings are formed by appropriate velocity modulation of the electron beam in the direction of horizontal scan. The natural grating formed by the horizontal scan of the electron beam serves as the green diffraction grating.

Differential charge deposited by the electron beam produces a deformation in the light modulating medium. The deformation rises exponentially to a maximum and thereafter decays as the charge on the surface of the light modulating medium decays through conduction through the light modulating medium. The time it takes for the deformation to reach 63 percent of maximum value in response to a step force function is referred to as the mechanical time constant, and the time it takes for the electric force producing the deformation to decay to 37 percent of its peak value is referred to as the electrical time constant. For the successful operation of the system it is important that the sum of the mechanical and electrical time constant be of the order of the duration of a field of scan, i.e., the deformation should have decayed to about one-third of its peak value by the time the electron beam is in a position to deposit another pattern of charge at that point.

Consider now an element of the raster representing a picture element. Consider portions of three diffraction gratings being formed on such portion. For good rendition of the color composition of such portion in a projected image it is important that in the absence of any video modulation of any one of the three color components that no grating be formed at any point in the light modulating medium and that no light be diffracted. As a grating is formed light should be diffracted and increase in intensity in accordance with the amplitude of the grating to a certain maximum value and that the variation from zero diffraction of light to full diffraction of light should be in a specific ratio, for example, 100 to 1 to provide good gradations in that color. Such variation may be thought of in terms of the average efficiency of the grating which is defined as the amount of light of a color component passed by the diffraction grating as a percent of the total light incident on that portion of the grating. For good color rendition not only should there be a good range from zero to maximum efficiency for each of the color components, but also the maximum average efficiency for each of the color components should be approximately the same to give the desired range of color composition in the projected image. Expressed in other words, the maximum deformation produced for each of the primary colors in response to the differential charge distribution produced by the corresponding modulations should be comparable, and the time of rise and fall of the deformations associated with each of the gratings as well as the average value of such deformations should be more or less comparable to provide balanced average light transmission efficiencies for the three primary colors.

It has been found that the mechanical time constant of a grating is a function principally of the viscosity of the light modulating fluid, the depth of the light modulating fluid layer, the grating line spacing, and surface tension of the fluid. For high viscosity fluids the mechanical time constant is large and vice versa. For thin layers the mechanical time constant is large and vice versa. For large grating line spacing the mechanical time constant is large and vice versa. The mechanical time constant varies inversely as the fourth power of the grating line density when the line to line spacing of the grating is large in comparison to the depth of the light modulating medium. The electrical time constant is principally a function of the mode of conduction of charges through the fluid layer. The electrical time constant varies in a direct relationship with the product of viscosity and depth, and in an inverse relationship with electron beam current. It has also been found that mobility of charge carriers involved in the electrical decay of charge on the fluid varies in an inverse relation with the viscosity.

From the above considerations it is apparent that for the mechanical time constants of the deformations associated with each of the three diffraction gratings, the factors of viscosity and depth are the same. However, the factor of grating spacing is different. Typically the difference in spacing between the grating of largest line to line spacing to the smallest line to line spacing may be of the order of 2 to 1, and, in addition, the ratio of the mechanical time constant thereof varies approximately inversely as the fourth power of the density of such grating, i.e., the mechanical time constant of the large line to line spacing grating is considerably larger than the mechanical time constant of the smallest line to line spacing grating. It is also noted that in the kind of system discussed wherein the depth is small in relation to the line to line spacing the electrical decay, i.e., the electrical time constant, is not a function of the line to line spacing and is substantially the same for all three gratings. Accordingly, if a value of mechanical time constant and appropriate electrical time constant is selected for the deformations associated with the green diffraction grating to provide good average light transmission efficiency for green, the average light transmission efficiency of the red grating which may be the grating of smallest line to line spacing would be poor due to the fact that the mechanical time constant associated with deformations of such gratings would be very short and consequently the deformations would rise rapidly and decay to a small value prior to the termination of a field.

In U.S. patent application Ser. No. 419,495, filed Dec. 18, 1964 and assigned to the assignee of the present invention there is disclosed and claimed a solution to the problem outlined above brought on by the difference in time constant of the grating of largest and smallest line to line density.

In accordance with one aspect of the present invention the natural grating formed by the raster lines of a field is doubled in density thereby making the line to line spacing of the green grating in the system outlined above comparable to the line to line spacing of the red and blue gratings orthogonal thereto. With such an arrangement the rise and decay time of each of the diffraction gratings can be made comparable thereby providing comparable and balanced light transmission efficiency.

In connection with the deffraction grating formed by the raster lines of the system another problem arises from the requirement of interlace of scanning lines of the fields of a frame. In prior art systems the deformations associated with the green diffraction grating do not decay completely to zero value over the period of a field. In a succeeding field the lines of charge which produce the valleys of the deformations are deposited on what remains of the peaks of the prior deformations. Such action causes a cancellation of the deformations of the prior field and a build up of new deformations. In certain cases, for example, when a light field follows a dark field wherein the fluid is relatively undeformed the differential charge, being of a magnitude to form not only valleys of desired average depth but also to overcome the residual prior deformation, now would displace fluid into positions of adjacent valleys. Such action is particularly noticeable at transitions in the projected image, i.e., at the edges of objects, and manifests itself not only as poor green resolution but also in the existence of green edges around objects, and the occurrence of green trailers associated with motion in the projected image. A measure of this limit is the cancellation ratio which is defined as the average groove or valley depth of the green grating without interlace for a particular system to the average groove or valley depth with interlace. A cancellation ratio of 2 to 1 is tolerable in the system. When the cancellation ratio becomes progressively greater than 3 to 1 the effects mentioned above become progressively greater and the resultant projected image becomes marginal. Also, with departures from perfect interlace, due to such causes as non linearities in vertical sweep and variations in the vertical sweep of one field over the preceding field, the lines of successive fields move into a position where they are paired instead of interlaced. Such a condition produces flashing of green in the projected image which becomes more apparent and objectionable at higher cancellation ratios. Of course, if the deformations associated with the green grating were allowed to decrease to an inappreciable value such problem would not arise.

In accordance with another aspect of the present invention such effects due to high cancellation ratios are avoided by providing a pair of lines of charge for each line or horizontal scan and arranging such lines of charge so they are one-half the spacing of the lines in a field of scan and further arranging such that the lines of charge of one field coincide with the lines of charge of a succeeding field. Such an arrangement effectively converts an interlace scan system into a noninterlace scan system for the purposes of the present invention.

Accordingly, an object of the present invention is to provide an improved projection system using a viscous light modulating medium and method of operation thereof.

It is another object of the present invention to provide in a color projection system using a viscous light modulating medium on which is superimposed light diffraction deformations, one of which utilized the natural raster formed by the scanning lines, means for changing the grating line density of such a grating to be comparable to the grating line density of the other diffraction grating thereof.

It is also an object of the present invention to provide an improved projection system using a viscous light modulating medium in which grating lines formed parallel to the lines of scan thereof may be varied in line to line spacing thereof to optimize the performance of the system.

It is also an object of the present invention to provide an improved projection system utilizing a viscous light modulating medium in which grating lines are formed parallel to the direction of scan of said light modulating medium by a beam of electrons in which the adverse effects of interlace in such a system are minimized.

The novel features believed to be characteristic of the invention are set forth in the appended claims. The invention itself, together with further objects and advantages thereof, may best be understood by the following description taken in connection with the following drawings in which:

FIGURE 9 also depicts the mechanical and electrical time constants of such deformation.

Figure 1:
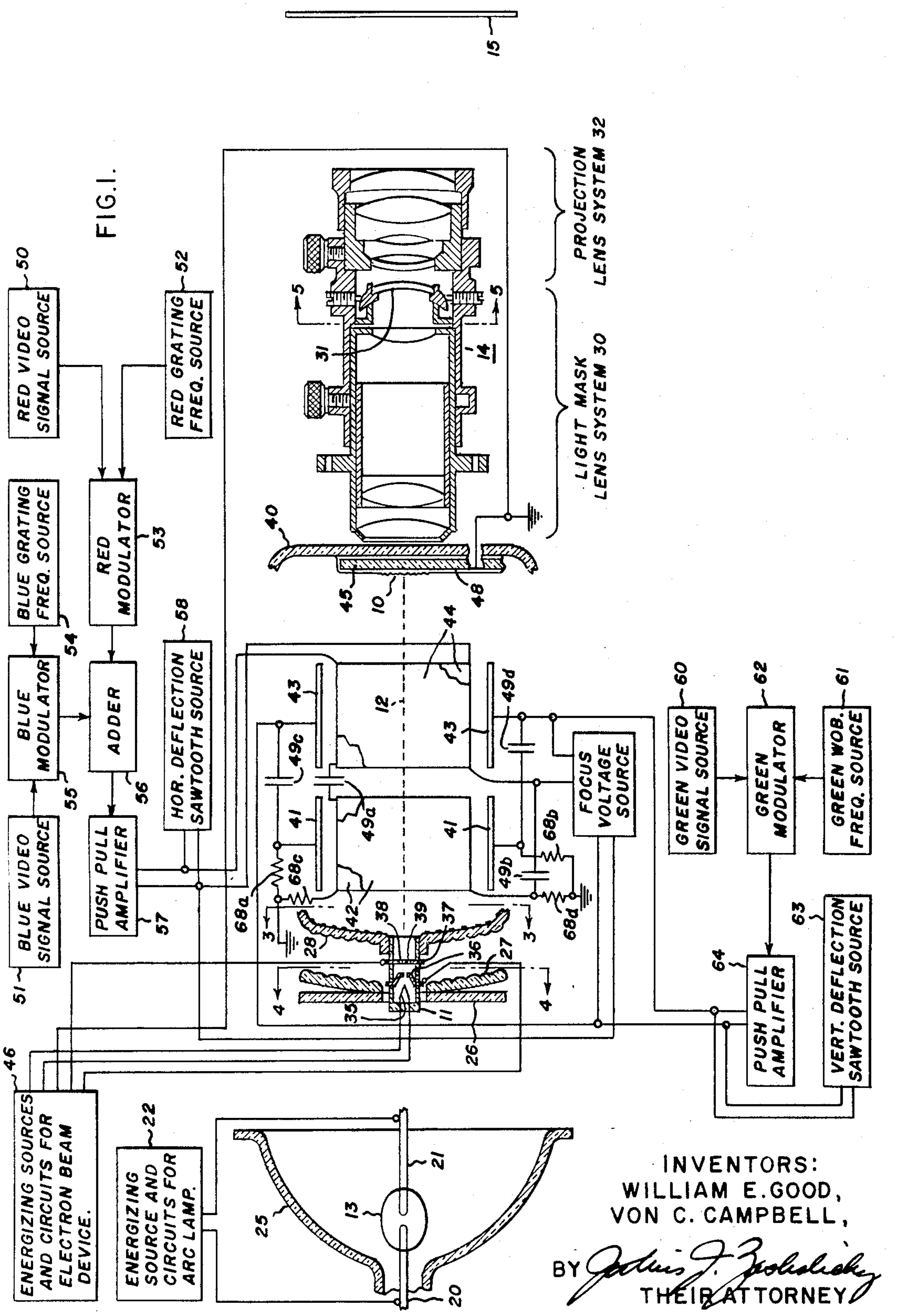
FIGURE 1 is a schematic diagram of the optical and electrical elements of a system useful in explaining the present invention.

Referring now to FIGURE 1 there is shown a simultaneous color projection system comprising an optical channel including a light modulating medium 10, and an electrical channel including an electron beam device 11, a beam of electrons 12 consisting of two vertical displaced components of which is coupled to the light modulating medium 10 in the optical channel. Light is applied from a source of light 13 through a plurality of beam forming and modifying elements onto the light modulating medium 10. In the electrical channel electrical signals varying in magnitude in accordance with the point by point variation in intensity in each of the three primary color constituents of an image to be projected are applied to the electron beam device 11 to modulate the beam thereof in the manner to be more fully described below, to produce deformations in the light modulating medium which modify the light transmitted by the modulating medium in point by point correspondence with the image to be projected. An apertured light mask and projection lens system 14, which may consist of a plurality of lens elements, on the light output side of the light modulating medium function to cooperate with the light modulating medium to control the light passed by the optical channel and also to project such light onto a screen 15 thereby reconstituting the light in the form of an image.

More particularly, on the light input side of the light modulating medium 10 are located the source of light 13 consisting of a pair of electrodes 20 and 21 between which is produced white light by the application of voltage therebetween from source 22, an elliptical reflector 25 positioned with the electrodes 20 and 21 located at the adjacent focus thereof, a generally circular filter member 26 having a vertically oriented central portion adapted to pass substantially only the red and blue, or magenta, components of white light and having segments on each side of the central portion adapted to pass only the green component of white light, a first lens plate member 27 of generally circular outline which consists of a plurality of lenticules stacked in a horizontal and vertical array, a second lens plate and input mask member 28 of generally circular outline also having a plurality of lenticules on one face thereof stacked in horizontal and vertical array, and the input mask on the other face thereof. The elliptical reflector 25 is located with respect to the light modulating medium 10 such that the latter appears at the other or remote focus thereof. The central portion of the input mask portion of member 28 includes a plurality of vertically extending slots between which are located a plurality of vertically extending bars. On the segments of the mask on each side of the central portion thereof are located a plurality of horizontally oriented slots or light apertures spaced between similarly oriented parallel opaque bars. The first plate member 27 functions to convert effectively the single arc source 13 into a plurality of such sources corresponding in number to the number of lenticules on the lens plate member 27, and to image the arc source on individual separate elements of the transparent slots in the input mask portion of member 28. Each of the lenticules on the lens plate portion of member 28 images a corresponding lenticule on the first plate member onto the active area of the light modulating medium 10. The filter member 26 is constituted of the portions indicated such that the red and blue light components from the source 13 register on the vertically extending slots of the input mask member 28, and green light from the source 13 is registered on the horizontal slots of the input mask member 28.

On the light output side of the light modulating medium are located a mask imaging lens system 30 which may consist of a plurality of lens elements, an output mask member 31 and a projection lens system 32. The output mask member 31 has a plurality of parallel vertically extending slots separated by a plurality of parallel vertically extending opaque bars in the central portion thereof. The output mask member 31 also has a plurality of horizontally extending slots separated by a plurality of parallel horizontally extending opaque bars in a pair of segments on each side of the central portion thereof. In the absence of deformations in the light modulating medium 10, the mask lens system 30 images light from each of the slots in the input mask member 28 onto corresponding opaque bars on the output mask member 31. When the light modulating medium 10 is deformed, light is deflected or deviated by the light modulating medium, passes through the slots in the output mask member 31, and is projected by the projection lens system 32 onto the screen 15. The details of the light input optics of the light valve projection system shown in FIGURE 1 are described in the aforementioned copending patent application Ser. No. 316,606, filed Oct. 16, 1963, and assigned to the assignee of the present invention.

The output mask lens system 30 comprises four lens elements which function to image light from the slots in the input mask onto corresponding portions of the output mask in the absence of any physical deformation in the light modulating medium. The projection lens system 32 in combination with the light mask lens system 31 comprises a composite lens system for imaging the light modulating medium on a distant screen on which an image is to be projected. The projection lens system 32 comprises five lens elements. The plurality of lenses are provided in the light mask and projection lens system to correct for the various aberrations in a single lens system. The details of the light mask and projection lens system are described in patent application Ser. No. 336,505, filed Jan. 8, 1964, and assigned to the assignee of the present invention.

According to present day color television standards in force in the United States an image to be projected by a television system is scanned horizontally once every 1/15735 of a second by a light-to-electrical signal converter, and vertically at a rate of one field of alternate lines every one-sixtieth of a second. Correspondingly, an electron beam of a light producing or controlling device is caused to move at a horizontal scan frequency of 15,735 cycles per second in synchronism with the scanning of the light converter, and to form thereby images of light varying in intensity in accordance with the brightness of the image to be projected. The pattern of scanning lines, as well as the area of scan, is commonly referred to as the raster.

Figure 2A:
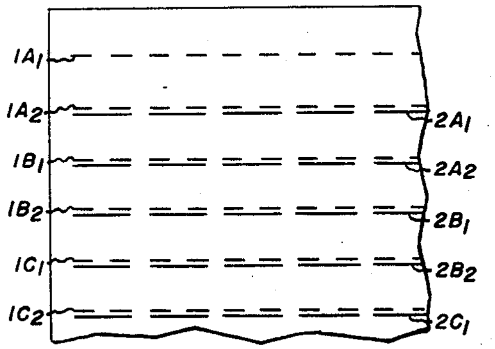
FIGURES 2A through 2C are a diagrammatic representation of the active area of the light modulating medium showing the horizontal scan lines and the location of charge with respect thereto for the various primary color channels of the system.

In FIGURE 2A is shown a section of the raster of the light modulating medium on which the green diffraction grating has been formed. The size of the raster or whole area scanned in the embodiment is approximately 0.82 inch in height and 1.10 inches in width. In this figure are shown the pairs of lines of charge laid down by each horizontal scan of the light modulating medium by the beam of electrons. Such lines of charge laid down by the first horizontal scan in the first field are designated 1A1 and 1A2, the first numeral indicating the field, the letter indicating the lines of scan and the numerical subscript indicating the line of charge in the scan. Similarly, the lines of charge laid down in the first field by the second horizontal scan and designated 1B1 and 1B2, the spacing of the lines of charge in each pair is one-half the normal spacing were a single beam utilized. The dotted lines designated 2A1 and 2A2 represent the charge laid down by the first horizontal scan in the second field, the numeral 2 indicating the second field, the designation A indicating the first line and the subscript indicating the first and second lines of charge in the pair. In the second field lines of charge in each pair are also spaced one-half the spacing in a field of scan utilizing just a single beam of electrons. The designation 2B1 and 2B2 indicate the charge laid down by the second horizontal scan of the electron beam in the second field. In this figure the lines of scan of the first and second fields are interlaced so that the lines of charge laid down by a horizontal scan in the second field coincides with the adjacent lines of charge laid down by successive lines of scan in the first field. For example, line of charge 2A1 coincides in position in the light modulating medium with the line of charge 1A2. While such lines of charge are shown in the figure as slightly displaced, such is shown only for the purpose of illustration.

Accordingly, it is seen that in accordance with the present invention the grating line spacing of the green diffraction grating is made one-half of what would be the arrangement were the natural scanning lines of a field used as the green diffraction grating. Such a grating now has a density comparable to the red and blue diffraction gratings which will be described below, thereby enabling the rise and fall time of deformations of the green diffraction grating to be made comparable to the rise and fall time of the red and blue grating with the advantages indicated above. Also with such a provision lines of charge are formed in the same locations in each of the two fields thereby avoiding the adverse effects produced in the light modulating medium when the lines of charge in a field are laid on the residual peaks of a preceding field.

The green diffraction grating is controlled in amplitude by reflecting the electron scanning beam at a very high frequency, nominally at about 48 megacycles, in the vertical direction, i.e., perpendicular to the direction of the lines to produce a uniform spreading out or smear of the charge transverse to the scanning direction of the beam. The amplitude of the smear in such direction varies proportionally with the amplitude of the high frequency carrier signal which amplitude varies inversely with the amplitude of the green video signal. The frequency chosen is higher than either the red or blue frequency to avoid the undesired interaction with signals of other frequencies of the system including the video signals and the red and blue carrier waves, as will be more fully explained below. With low amplitude modulation of the carrier wave more charge is concentrated in a line along the center of lines of charge than with high amplitude modulation thereby producing a greater deformation in the light modulating medium at that part of the line. In short, the grating formed by the focused beam represents maximum green video signal or light field, and the defocusing by the high frequency carrier deteriorates or smears such grating under conditions of minimum green video signal. For this dark field the grating is virtually wiped out.

Figure 2B:
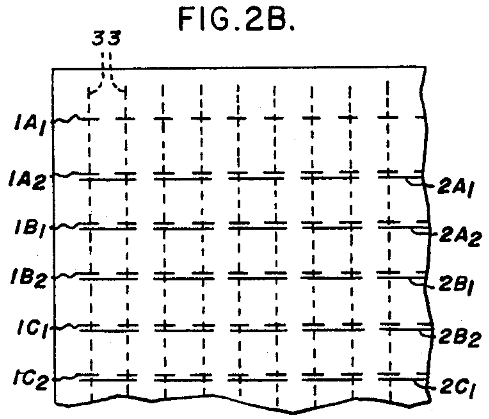

In FIGURE 2B is shown in schematic form a portion of the raster in the light modulating medium along with the diffraction grating corresponding to the red color component. The horizontal dash lines designated as in FIGURE 2A represent the pairs of lines of charge laid down by each horizontal scan of each field of the raster. The spaced vertically oriented dotted lines 33 on each of the raster lines, i.e., extending across the raster lines schematically represent concentrations of charge laid down by an electron beam to form the red diffraction grating in a manner to be described hereinafter, such concentrations occurring at equally spaced intervals on each line, corresponding parts of each scanning line having similar concentrations thereby forming a series of lines of charge equally spaced from adjacent lines which cause the formatoins of valleys in the light modulating medium, the depth of such valleys, of course, depending upon the concentration of charge. Such a result is produced by a signal superimposed on an electron beam moving horizontally at a frequency of 15,735 cycles per second, a carrier wave, of smaller amplitude but of fixed frequency of the order of 16 megacycles per second thereby producing a line to line spacing in the grating of approximately $\frac{1}{760}$ of an inch. The high frequency carrier wave causes a velocity modulation of the beam thereby causing the beam to move in steps, and hence to lay down the pattern of charge schematically depicted in this figure with each line or valley extending in the vertical direction and adjacent lines or valleys being spaced apart by a distance determined by the carrier frequency producing the lines.

Figure 2C:
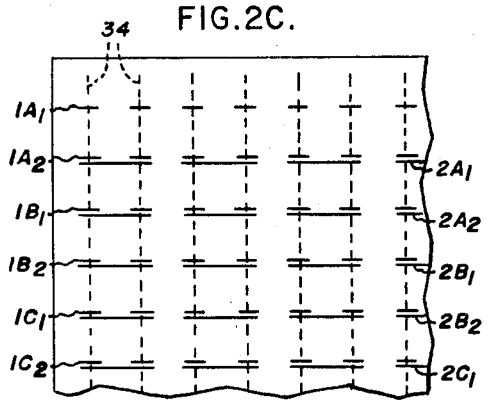

In FIGURE 2C is shown a section of the raster on which the blue diffraction grating has been formed. As in the case of the red diffraction grating the vertically oriented dotted lines 34 of each of the pairs of lines of charge laid down by each horizontal scan of each of the fields represents concentrations of charge laid down thereby. The grating line to line spacing is uniform, and the amplitude thereof varies in accordance with the amount of charge present. The blue grating is formed in a manner similar to the manner of formation of the red grating, i.e., a carrier frequency of amplitude smaller than the horizontal deflection wave is applied to produce a velocity modulating in the horizontal direction of the electron beam, at that frequency rate, thereby to lay down charges on each line that are uniformly spaced with the line spacing being a function of the frequency. A suitable frequency is nominally 12 megacycles per second.

As used in this specification with reference to the specific raster area of the light modulating medium, a point represents an area of the order of several square mils and corresponds to a picture element. For the faithful reproduction or rendition of a color picture element three characteristics of light in respect to the element need to be reproduced, namely, luminance, hue, and saturation. Luminance is brightness, hue is color, and saturation is fullness of the color. It has been found that in general a system such as the kind under consideration herein that one grating line is adequate to function for proper control of the luminance characteristic of a picture element in the projected image and that about three to four lines are a minimum for the proper control of hue and saturation characteristics of a picture element.

Phase diffraction gratings have the property of deviating light incident thereon, the angular extent of the deviation being a function of the line to line spacing of the grating and also of the wavelength of light. For a particular wavelength a large line to line spacing would produce less deviation than a small line to line spacing. Also for a particular line to line spacing short wavelengths of light are deviated less than long wavelengths of light. Phase diffraction gratings also have the property of transmitting deviated light in varying amplitude in response to the amplitude or depth of the lines or valleys of the grating. Accordingly it is seen that the phase diffraction grating is useful for the point by point control of the intensity of the color components in a beam of light. The line to line spacing of the grating controls the deviation, and hence color component selection, and the amplitude of the grating controls the intensity of such component. In the specific system under consideration herein substantially the first and second diffraction orders of light are utilized in the red and blue primary color channels, and the first and third diffraction orders of light are used in the green primary color channel. The manner in which the instantaneous efficiency of the first, second and third orders vary with depth of deformation, and also the manner in which the sums of various ones of the orders varies with the depth of deformation are described in connection with FIGURES 6 and 7. The manner in which the average efficiency for combinations of various ones of the first, second and third orders varies with depth of deformation will be described in detail in connection with FIGURE 8.

Referring again to FIGURE 1, an electron writing system is provided for producing the phase diffraction gratings in the light modulating medium, and comprises an evacuated enclosure 40 in which are included an electron beam device 11 having a cathode 35, a control electrode 36, and a first anode 37 having a pair of vertically positioned holes 38 and 39 to produce a pair of vertically positioned components in the electron beam from cathode 35, a pair of vertical deflection plates 41, and a pair of horizontal deflection plates 42, a set of vertical focus and deflection electrodes 43, a set of horizontal focus and deflection electrodes 44, and the light modulating medium 10. The cathode 35, control electrode 36, and first anode 37 along with the transparent target electrode 48 supporting the light modulating medium 10 are energized from a source 46 to produce in the evacuated enclosure an electron beam having two components that at the point of focusing on the light modulating medium is of small dimensions, each component having a cross section of the order of a mil, and of low current (a few microamperes), and high voltage (about 8 kilovolts). Electrodes 41 and 42, connected to ground through respective high impedances 68*a*, 68*b*, 68*c*, and 68*d* provide a deflection and focus function, but are less sensitive to applied deflection voltages than electrodes 43 and 44. The electrodes 43 and 44 control both the focus and deflection of the electron beam in the light modulating medium in a manner to be more fully explained below.

A pair of carrier waves which produce the red and blue gratings, in addition to the horizontal deflection voltage are applied to the horizontal deflection plates 44. The electron beam, as previously mentioned, is deflected in steps separated by distances in the light modulating medium which are a function of the grating spacing and of the desired red and blue diffraction gratings. The period of hesitation at each step is a function of the amplitude of the applied signal corresponding to the red and blue video signals. A high frequency carrier wave modulated by the green video signal, in addition to the vertical sweep voltage, is applied to the vertical deflection plates 41 to spread the beam out in accordance with the amplitude of the green video signal as explained above. The viscous light modulating medium 10 is supported on transparent member 45 coated with a transparent conductive layer 48 adjacent the medium such as indium oxide. The viscosity and other properties of the light modulating medium are selected such that the deposited charges produce the desired deformations in the surface and such that the amplitude of the deformations decay to a small value after each field of scan thereby permitting alternate variations in amplitude of the diffraction grating at the sixty cycle per second field scanning rate to be described in greater detail in connection with FIGURE 9. The conductive layer is maintained at ground potential and constitutes the target electrode for the electron writing system. Of course, in accordance with television practice the control electrode is also energized after each horizontal and vertical scan of the electron beam by a blanking signal obtained from a conventional blanking circuit (not shown).

Above the evacuated enclosure 40 are shown in functional blocks the source of the horizontal deflection and beam modulating voltages which are applied to the horizontal deflection plates to produce the desired horizontal deflection. This portion of the system comprises a source of red video signal 50, and a source of blue video signal 51 each corresponding, respectively, to the intensity of the respective primary color component in a television image to be projected. The red video signal from the source 50 and a carrier wave from the red grating frequency source 52 are applied to the red modulator 53 which produces an output in which the carrier wave is modulated by the red video signal. Similarly, the blue video signal from source 51 and carrier wave from the blue grating frequency source 54 is applied to the blue modulator 55 which develops an output in which the blue video signal amplitude modulates the carrier wave. Each of the amplitude modulated red and blue carrier waves are applied to an adder 56 the output of which is applied to a push-pull amplifier 57. The output of the amplifier 57 is applied to the horizontal plates 44. The output of the horizontal deflection sawtooth source 58 is also applied to plates 44 and to plates 42 through capacitors 49*a* and 49*b*.

Below the evacuated enclosure 40 are shown in block form the circuits of the vertical deflection and beam modulation voltages which are applied to the vertical deflection plates to produce the desired vertical deflection. This portion of the system comprises a source of green video signal 60, a green grating or wobbulating frequency source 61 providing high frequency carrier energy, and a modulator 62 to which the green video signal and carrier signal are applied. An output wave is obtained from the modulator having a carrier frequency equal to the carrier frequency of the green grating frequency source and an amplitude varying inversely with the amplitude of the green video signal. The modulated carrier wave and the output from the vertical deflection source 63 are applied to a conventional push-pull amplifier 64, the output of which is applied to vertical plates 43 to produce deflection of the electron beam in the manner previously indicated. The output of the vertical deflection sawtooth source 63 is also applied to the plates 43 and to plate 41 through capacitors 49*c* and 49*d*.

A circuit for accomplishing the deflection and focusing functions described above in conjunction with the deflection and focusing electrode system comprising two sets of four electrodes such as shown in FIGURE 1 is shown and described in copending patent applications Ser. No. 335,-117, filed Jan. 2, 1964, and Ser. No. 471,993, filed July 14, 1965 (docket 15D–4798) both assigned to the assignee of the present invention. An alternative electrode system and associated circuit for accomplishing the deflection and focusing function is described in the aforementioned copending patent application Ser. No. 343,990.

As mentioned above the red and blue channels make use of the vertical slots and bars and the green channel makes use of the horizontal slots and bars. The width of the slots and bars, in one arrangement or array is one set of values and the width of the slots and bars in the other arrangement is another set of values. The raster area of the modulating medium may be rectangular in shape and has a ratio of height to width or aspect ratio of three to four in accordance with television standards in force in the United States. The center-to-center spacing of slots in the horizontal array is made three halves the center-to-center spacing of the slots in the vertical array. Each of the lenticules in each of the lenticular plates are proportioned, i.e., with height to width ratio of three to four. The lenticules in each plate are stacked into horizontal rows and vertical columns. Each of the lenticules in one plate are of one focal length and each of the lenticules on the other plate are of another focal length. The filter element may be constituted to have three sections registering light of red and blue color components in the central portion of the input mask and green light in the side sector portions as will be apparent from considering FIGURE 3.

Figure 3:
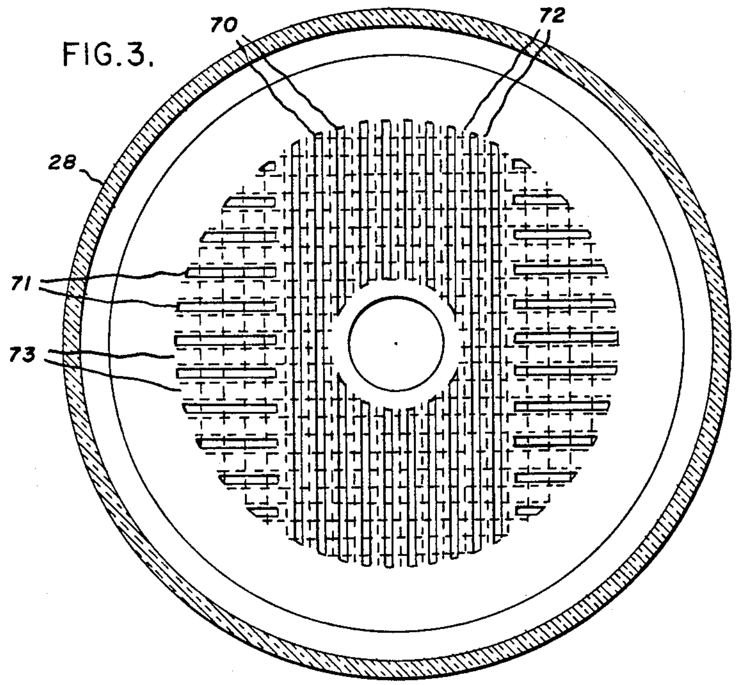
FIGURE 3 is an end view taken along section 3—3 of the system of FIGURE 1 showing the second lenticular lens plate and the input mask thereof of the system of FIGURE 1.

In FIGURE 3 is shown a view of the face of the second lenticular lens plate and input mask 28 as seen from the raster area of the modulating medium or along section 3—3 of FIGURE 1. In this figure the vertical oriented slots 70 are utilized in the controlling of the red and blue light color components in the image to be projected. The horizontally extending slots 71 located in the sector area in the input mask on each side of the central portion thereof function to cooperate with the light modulating medium and light output mask to control the green color component in the image to be projected .The ratio of the center-to-center spacing of the horizontal slots 71 to the center-to-center spacing of the vertical slots 70 is three-halves. The rectangular areas enclosed by the vertical and horizontal dash lines 72 and 73 are the boundaries for the individual lenticules appearing on the opposite face of the plate 28. The focal length of each of the lenticules is the same. The center of each of the lenticules lies in the center of an element of a corresponding slot.

Figures 4, 5:
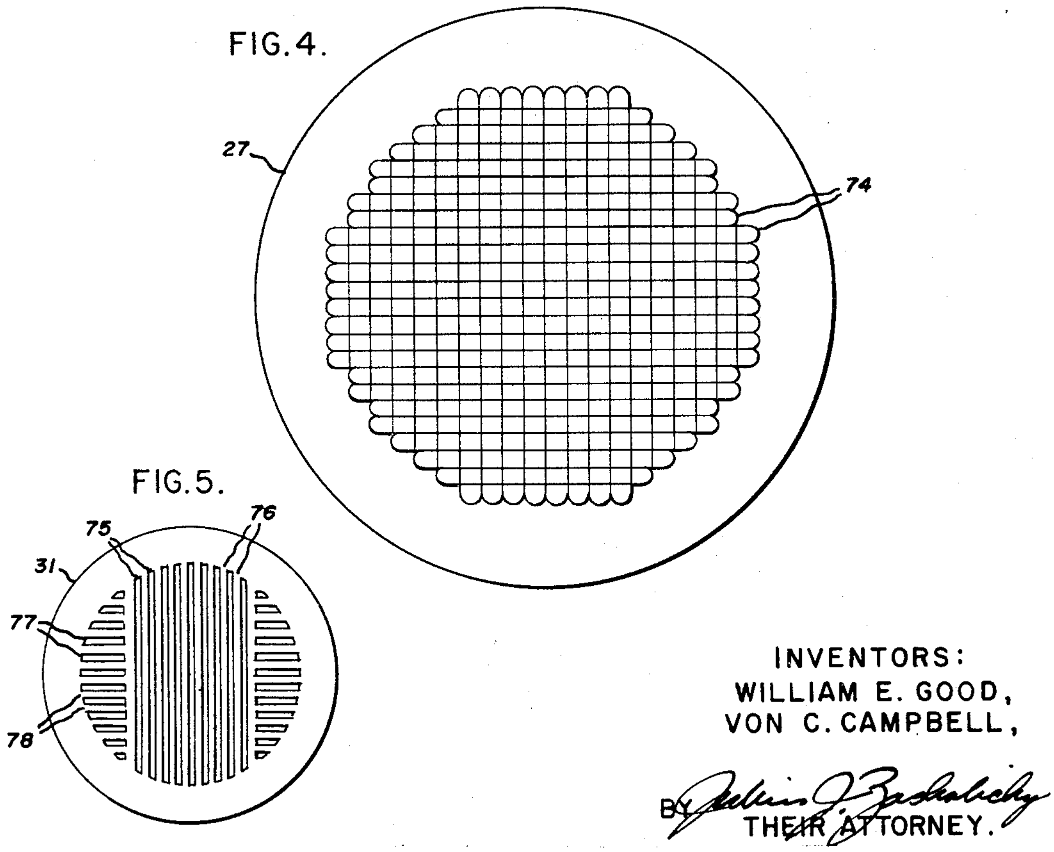
FIGURE 4 is an end view taken along section 4—4 of the system of FIGURE 1 showing the first lenticular lens plate thereof.
FIGURE 5 is an end view taken along section 5—5 of the system of FIGURE 1 showing the light output mask thereof.

FIGURE 4 shows the first lenticular lens plate 27 taken along section 4—4 of FIGURE 1 with horizontal rows and vertical columns of lenticules 74. Each of the lenticules of this plate cooperates with a correspondingly positioned lenticule on the second lenticular lens plate shown in FIGURE 3 in the manner described above. Each of the lenticules on plate 27 have the same focal length which is different from the focal length of the lenticules on the second lenticular plate 28.

FIGURE 5 shows the light output mask 31 of FIGURE 1 taken along section 5—5 thereof. This mask consists of a plurailty of transparent slots 75 and opaque bars 76 in a central vertically extending section of the mask and a plurality of transparent slots 77 and opaque bars 78 in each of two segments of the spherical mask lying on each side of the central portion thereof. As mentioned previously the slots and bars from the output mask are in a predetermined relationship to the slots and bars of the input mask. As the grating density of the green grating is now twice the density in the arrangement wherein a single beam is utilized the diffraction angle is now twice as large. Accordingly, the slots and bars associated with the green channel are twice as large.

Figure 6:
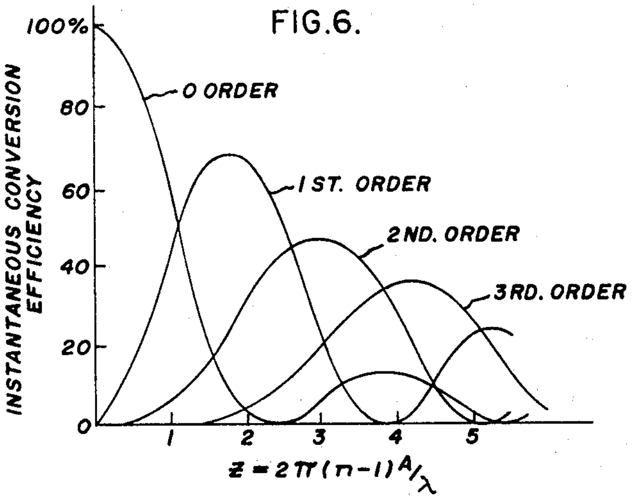
FIGURE 6 shows graphs of the instantaneous conversion efficiency of the light diffracting gratings formed in the light modulating medium as a function of the depth of modulation or deformation for various diffraction orders.

Referring now to FIGURE 6 there are shown graphs of the instantaneous conversion efficiency of the light diffracting grating formed in the light modulating medium as a function of the depth of modulation or deformation of the light modulating medium for various diffraction orders. In this figure instantaneous conversion efficiency for light directed on to the light modulating medium is plotted along the ordinate in percent and the deformation function Z, where $$Z=2\pi(n-1)h/\lambda$$

is plotted along the abscissa. In the above relationship $h$ represents peak to peak amplitude or depth of deformation, $\lambda$ represents the wavelength of light involved and $n$ represents the refractive index of the light modulating medium. Graphs 80, 81, 82, and 83 show such relationship for the zero, the first, the second, and the third orders of diffracted light, respectively. In connection with this figure it is readily observed that when the light modulating medium is undeformed that all of the light is concentrated in the zero order which represents the undiffracted path of the light. Of course, the light passing through the light modulating medium would be deviated slightly by refraction of the light modulating medium as normally the index of refraction of the light modulating medium is different from the index of refraction of vacuum or air surrounding the medium, and is conveniently selected to be approximately in the range of refraction indicies of the material of the various vitreous optical elements utilized in the system. The output mask is positioned in relationship to the input mask such that when the light modulating medium is undeformed the slots of the input mask are imaged on the bars of the output mask and thus the slight refraction effects that occur are allowed for. As the depth of modulation for a given grating is increased, progressively more light appears in the various diffraction orders higher than the zero order. Typically the maximum depth of modulation is about 1.0 microns. Progressively as the peak efficiency of the first, second and higher orders of light is reached the value of the maximum efficiency of the higher order of light becomes progressively smaller. As can be readily seen from the graphs the maximum efficiencies of light in the first order, second and third orders is approximately 67 percent, 47 percent, and 37 percent, respectively.

Figure 7:
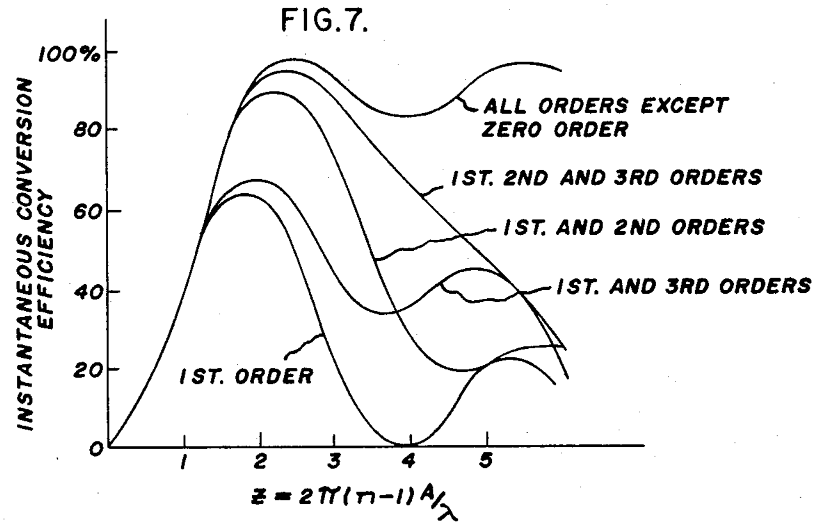
FIGURE 7 shows graphs of the instantaneous conversion efficiency of the light diffracting gratings formed in the light modulating medium as a function of the depth of modulation or deformation for various combinations of diffraction orders.

In FIGURE 7 are shown graphs of the instantaneous conversion efficiency versus Z, the function of the depth of modulation set forth above, for various combinations of diffraction orders. In this figure instantaneous conversion efficiency is plotted in percent along the ordinate, and the parameter Z is plotted along the abscissa. Graph 85 shows the manner in which the instantaneous conversion efficiency of the first order increases when the depth of modulation reaches a peak at approximately 67 percent and thereafter declines. Graph 86 shows the manner in which the instantaneous conversion efficiency for the sum of the first and second orders of diffracted light increases reaching a peak of approximatelly 93% and thereafter declines. Similarly, graph 87 shows the manner in which the instantaneous conversion efficiency of the diffraction grating varies for the sum of the first and third orders increases reaching a peak of approximately 69% and thereafter declines. Finally, graph 88 shows the manner in which the instantaneous conversion efficiency of the sum of the first, second and third orders of light increases to a peak of approximately 98% and thereafter declines. Graph 89 shows instantaneous conversion efficiency of the sum of all orders except the zero order.

Figure 8:
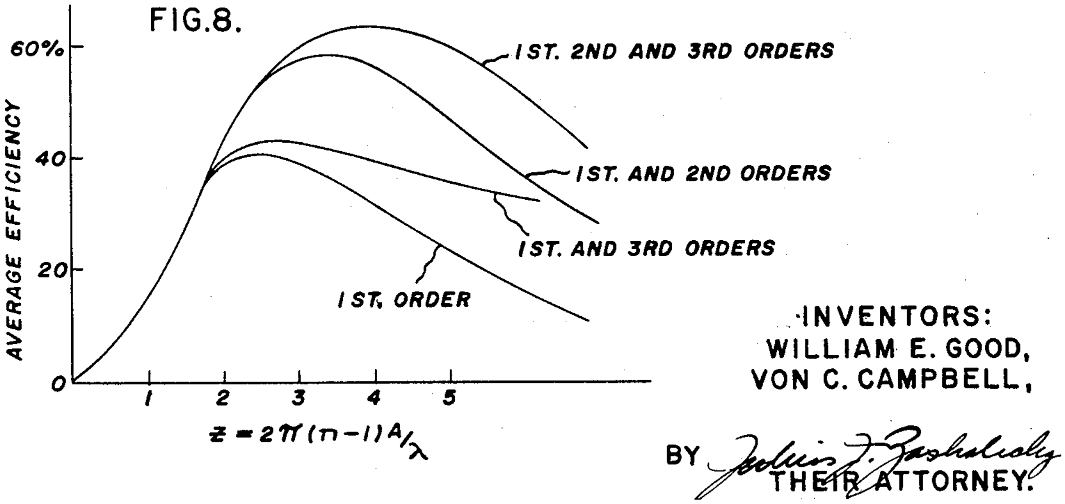
FIGURE 8 shows graphs of the average efficiency for linear decay of the light diffraction gratings formed in the light modulating medium as a function of the depth of modulation or deformation for various combinations of diffraction orders.

In FIGURE 8 are shown a group of graphs on the average conversion efficiency for the various combinations of diffraction orders as a function of the amplitude of deformation. The average conversion efficiency is represented in percent along the ordinate, and amplitude in terms of the aforementioned parameter Z is plotted along the abscissa. For the proper operation of the system of FIGURE 1 it is necessary for the light modulating medium to retain the diffraction deformations produced therein over a period comparable to the period of a scanning field. Ideally, each point of the light modulating medium should retain the deformation unattenuated until it is subject to a new deformation in response to the modulating signal. Practically, such an ideal situation cannot be met as the charge on the light modulating medium decays and thereby permits the diffraction patterns in the light modulating medium to decay. Under such practical conditions it is desirable for the deformations to decay to a small value over the period of a field of the television scanning process so that new deformation information can be applied to the light modulating medium. The average efficiency graphs of FIGURE 8 are based on the decay of the deformations to approximately one-third their initial value over a period of a field. Accordingly, even after the electron charge has been deposited by the electron beam to produce the deformation the existence of the deformation continues to diffract the light incident on the medium. Graphs 90, 91, 92, and 93 show, respectively, the average efficiency of the first diffraction order, the sum of the first and second orders, the sum of the first and third orders, and the sum of the first, second and third orders.

Figure 9:
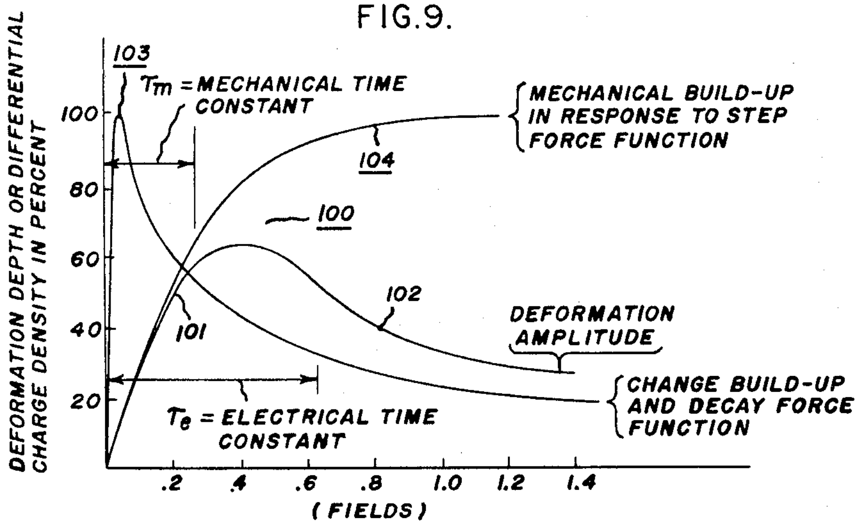
FIGURE 9 shows a graph of change in thickness of the light modulation fluid in response to differential charge deposited thereon, or deformation depth, versus time useful in explaining the operation of the system of FIGURE 1 in accordance with the present invention.

Referring now to FIGURE 9 there is shown a graph 100 of the change in thickness or depth of the fluid layer due to differential charge on the fluid layer versus time in terms of the period of a field. The graph 100 represents the deformations produced by differential charge on element of the fluid layer corresponding to a picture element. The graph has an exponentially rising portion 101 and an exponentially decaying portion 102. Also shown in the figure are graphs of the force function 103 of electron charge build up and decay on the surface of the layer. Such force function builds up rapidly and decays exponentially. The time it takes for the decay to fall to 37% of its peak value is referred to as the electrical time constant $\tau_e$ of the deformation. Also shown in this figure is a graph 104 of the mechanical build up in response to a step force function. After the application of a deforming force to the fluid layer it takes time for the fluid to conform to the condition required by such forces. The time it takes for the mechanical build up force function to rise to 63% of its peak value is referred to as the mechanical time constant $\tau_m$ of the deformation. The electrical time constant is a function principally of the conduction mechanism of the fluid. It has been found empirically that the electrical time constant varies directly with the square root of the product of viscosity and layer depth and inversely as the square root of electron beam current. It has also been found that mobility of the charge carriers involved in the conduction mechanism of charge decay on the surface varies in an inverse relationship to the viscosity of the layer. Mobility is defined as velocity of the charge carrier per unit of electric field strength. The mechanical time constant is dependent in principal part on the viscosity of the fluid layer, the depth of the fluid layer and the grating line density of which the deformation is a part. It has been found that as the viscosity of the layer is increased the mechanical time constant of the deformation is increased. It also has been found that the mechanical time constant varies inversely as the cube of depth of the layer. It also has been found in systems such as the system described in FIGURE 1 where the depth of the layer is small in comparison to the line to line spacing of the diffraction gratings that the mechanical time constant of the deformation varies inversely as the fourth power of the grating line density. The electrical decay is independent of line to line spacing of the gratings for depths which are small or even comparable to the line to line spacing of the gratings, i.e., as long as the predominant path of the conduction for surface charge is through the fluid. The mechanical time constant is also a function of the surface tension of the fluid and its mass. While these properties are important in the deformation process they are not susceptible of sufficient variation to be useful in producing variations in mechanical time constant as the three properties mentioned above, namely, the viscosity, depth and grating line density.

For the successful operation of the system of FIGURE 1 it is important that the sum of the mechanical and electrical time constants be of the order of the time of a field of scan as described and claimed in the aforementioned patent application Ser. No. 419,495. The time of rise and fall of deformations associated with each of the gratings as well as the average value of such deformations during a field of scan should be more or less comparable to provide comparable average light transmission efficiency in each of the three primary color channels. It has been pointed out above that the mechanical time constants for the deformations associated with each of the three diffraction gratings of different line to line spacing are a function of line to line spacing, viscosity and depth of fluid. As the factors of viscosity and depth are the same for each of the three gratings, any difference in values of their mechanical time constants would result from difference in line to line spacing. The mechanical time constant of deformations associated with each of these gratings is a function of the reciprocal of the fourth power of the grating line density. Thus it is readily apparent that a problem is presented with regard to the maintenance of comparable rise and fall times for the deformations and the maintenance of proper average values of such deformation to provide comparable light transmission efficiencies in the gratings.

In the aforementioned patent application Ser. No. 419,495, there is disclosed and claimed a solution to the problem outlined above. In this solution the depth of the modulating fluid is increased to the point where mechanical time constants of the three diffraction gratings are comparable, i.e., the time constant of the green diffraction grating is lowered by increasing the depth of fluid modulating layer. However, when the depth of the fluid is increased beyond a certain critical depth there is developed in the fluid random undulations which seriously impair the projection of images in such a system. Accordingly, other compromises have to be made to provide good and balanced efficiences, and the amount of balancing in the rise and decay time of the three diffraction gratings is somwhat limited. In the arrangement in accordance with the present invention the balancing of the mechanical time constant is provided by doubling the grating density of the green grating, i.e., the grating formed by the raster lines to provide a green diffraction grating which is comparable in line to line spacing to the line to line spacing of red and blue grating orthogonal thereto. With such an arrangement the rise and decay time of each of the diffraction gratings can be made comparable thereby providing comparable and balanced light efficiencies for each of the three channels.

In connection with the diffraction grating formed by the raster lines of the system another problem is presented which arises from the requirement of interlace of scanning lines of the fields of a frame. In the prior systems the deformations associated with the green diffraction grating do not decay completely to zero value over the period of a field. In a succeeding field the lines of charge which produce the valleys of the deformations are deposited on what remains of the peaks of the deformations. Such action causes a cancellation of the image of the prior field and a build up of a new image. In certain cases, for example, when a light field follows a dark field wherein the fluid is relatively undeformed the differential charge, being of a magnitude to form not only valleys of desired average depth but also to overcome the residual prior deformation, now would displace fluid into positions of adjacent valleys. Such action is particularly noticeable at transistions in the projected image, i.e., at the edges of objects, and manifests itself not only as poor green resolution but also in the existence of green edges around objects, and the occurrence of green trailers associated with motion in the projected image. A measure of this limit is the cancellation ratio which is defined as the average groove or valley depth of the green grating without interlace for a particular system to the average groove or valley depth with interlace. A cancellation ratio of 2 to 1 is tolerable in the system. When the cancellation ratio becomes progressively greater than 3 to 1 the effects mentioned above become progressively greater and the resultant projected image becomes marginal. Also, with departures from perfect interlace, due to such causes as nonlinearities in vertical sweep and variations in the vertical sweep of one field over the preceding field, the lines of successive fields move into a position where they are paired instead of interlaced. Such a condition produces flashing of the green in the projected image which becomes more apparent and objectionable at higher cancellation ratios. Of course, if the deformations associated with the green grating were allowed to decrease to an inappreciable value such problem would not be presented.

In accordance with another aspect of the present invention such cancellation effects are avoided by providing a pair of lines of charge for each line of horizontal scan and arranging such lines of charge so they are one-half the spacing of the lines in a field of scan and further arranging such that the lines of charge of one field coincide with the lines of charge of a succeeding field. Such an arrangement would operate in a system utilizing interlace scanning and effectively converts an interlace scan system into a noninterlace scan system for the purposes of the present invention.

Figure 10:
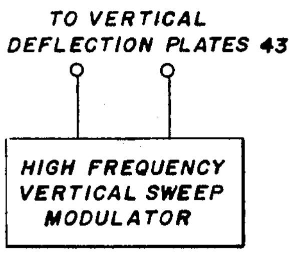
FIGURE 10 shows a modification of the system of FIGURE 1 in accordance with another aspect of the present invention.

The double lines of charge laid down for a single scan of the electron beam may be achieved by means other than that disclosed, for example such a result could be achieved by utilizing a single electron beam. In such an arrangement the anode plate 37 would be replaced by an anode plate having a single pole to produce a single electron beam. The beam would be modulated vertically by applying a high frequency signal of suitable amplitude, for example a high frequency of 24 megacycles, preferably of square wave form, and $\frac{1}{525}$ of the amplitude of the vertical sweep connected to the vertical defraction plates 43 as shown in FIGURE 10. Such a signal would cause the electron beam in its horizontal scan to oscillate between two lines spaced at the line to line spacing of a frame to lay down a pair of lines of charge for each horizontal line of scan.

While the invention has been described in connection with a simultaneous color television projection system it is equally applicable to monochrome and color field sequential systems. In a monochrome system, particularly one utilizing the gratings formed parallel to the horizontal scan lines of the electron beam, spurious effects, while not as serious as in a color projector, none the less appear due to the cancellation effects alluded to above which impair the projected image. In color field sequential systems the primary colors in an image to be projected are projected at a field rate. Also, when interlace is used it is important that the conditions in the fluid on which the field is written be relatively the same for each field or nearly so otherwise the charge pattern laid down by that field does not produce the same pattern of deformations. Such a result is difficult to achieve in an interlace system. With an effective conversion of an interlace system to a noninterlace system by the provisions of the present invention such desired conditions are more nearly achieved with the resultant that better field sequential color projection is achieved. In simultaneous color projection, in field sequential, and in monochrome systems in accordance with the present invention more uniform field writing conditions are achieved in an interlace system.

While the invention has been described in specific embodiments, it will be appreciated that many modifications may be made by those skilled in the art, and we intend by the appended claims to cover all such modifications and changes as fall within the true spirit and scope of the invention.

What we claim as new and desire to secure by Letters Patent of the United States is:

1. A system for controlling point by point the intensity of a beam of light for projecting an image in response to an electrical signal corresponding to said image comprising:
- a layer of light modulating fluid deformable by electric charges deposited thereon,
- means for directing said beam of light on said layer,
- means for directing a beam of electrons upon said layer to deposit such charges on said layer,
- means to deflect said electron beam over said layer in one direction in successive lines at an intermediate frequency rate and in another direction perpendicularly to said one direction at a low frequency rate to form a raster thereon,
- said electron beam having two components displaced from one another in said other direction and conjointly controlled whereby each line of scan in said one direction provides a pair of lines of charge on said medium, corresponding lines in successive pairs of lines of charge being displaced by twice the separation of lines of charge in a pair, whereby a diffraction grating is formed on said layer having lines of deformation directed in said one direction twice the density of a diffraction grating formed by the lines of scan of a field,
- means for modulating said beam of electrons by said electrical signal corresponding to the intensity of light in an image to be projected to modulate the amplitude of the diffraction grating in accordance with the amplitude of said signal,
- a light and optical system for projecting light as a function of the deformations in said fluid layer.

2. A system for controlling point by point the intensity of a beam of light for projecting an image in response to an electrical signal corresponding to said image comprising:
- a layer of light modulating fluid deformable by electric charges deposited thereon,
- means for directing said beam of light on said layer,
- means for directing a beam of electrons upon said layer to deposit such charges on said layer,
- means to deflect said electron beam over said layer in one direction in successive lines at an intermediate frequency rate and in another direction perpendicularly to said one direction at a low frequency rate to form a raster thereon,
- said electron beam having two components displaced from one another in said other direction and conjointly controlled whereby each line of scan in said one direction provides a pair of lines of charge on said medium, corresponding lines in successive pairs of lines of charge being displaced by twice the separation of lines of charge in a pair, whereby a diffraction grating is formed on said layer having lines of deformation directed in said one direction twice the density of a diffraction grating formed by the lines of scan of a field,
- means for modulating said beam of electrons in said other direction by a fixed high frequency carrier wave modulated inversely in amplitude by said electrical signal corresponding to the intensity of light in an image to be projected to modulate the amplitude of the diffraction grating in accordance with the amplitude of said signal,
- the properties of the fluid being such that the time of the rise and fall of deformations due to the differential charge on said media is comparable to a field of scan,
- a light and optical system for projecting light as a function of the deformations in said fluid layer.

3. A system for controlling point by point the intensity of a beam of light for projecting an image in response to an electrical signal corresponding to said image comprising:
- a layer of light modulating fluid deformable by electric charges deposited thereon,
- means for directing said beam of light on said layer,
- means for directing a beam of electrons upon said layer to deposit such charges on said layer,
- means to deflect said electron beam over said layer in one direction in successive lines at an intermediate frequency rate and in another direction perpendicularly to said one direction at a low frequency rate to form a raster thereon consisting of a frame of two fields, the lines of one field of which are interlaced with the lines of the other thereof,
- said electron beam having two components displaced from one another in said other direction and conjointly controlled whereby each line of scan in said one direction provides a pair of lines of charge on said medium, corresponding lines in successive pairs of lines of charge being displaced by twice the separation of lines of charge in a pair, whereby a diffraction grating is formed on said layer having lines of deformation directed in said one direction twice the density of a diffraction grating formed by the lines of scan of a field, said lines of charge in each field being substantially superimposed,
- means for modulating said beam of electrons in said other direction by a fixed high frequency carrier wave modulated inversely in amplitude by said electrical signal corresponding to the intensity of light in an image to be projected to modulate the amplitude of the diffraction grating in accordance with the amplitude of said signal,
- the properties of the fluid being such that the time of the rise and fall of deformations due to the differential charge on said media is comparable to a field of scan,
- a light and optical system for projecting light as a function of the deformations in said fluid layer.

4. A system for controlling point by point the intensity of a beam of light for projecting an image in response to an electrical signal corresponding to said image comprising:
- a layer of light modulating fluid deformable by electric charges deposited thereon,
- means for directing said beam of lights on said layer,
- means for directing a beam of electrons upon said layer to deposit such charges on said layer,
- means to deflect said electron beam over said layer in one direction in successive lines at an intermediate frequency rate and in another direction perpendicularly to said one direction at a low frequency rate to form a raster thereon consisting of a frame of two fields, the lines of one field of which are interlaced with the lines of the other thereof,
- means for modulating said electron beam in position in said other direction by a square wave having an amplitude which is the reciprocal of the number of the lines in frame of the total deflection of the beam in said other direction and of high frequency to form two components of the beam displaced from one another in said other direction and conjointly controlled whereby each line of scan in said one direction provides a pair of lines of charge on said medium, corresponding lines in successive pairs of lines of charge being displaced by twice the separation of lines of charge in a pair, whereby a diffraction grating is formed on said layer having lines of deformation directed in said one direction twice the density of a diffraction grating formed by the lines of scan of a field, said lines of charge in each field being substantially superimposed, means for modulating said beam of electrons in said other direction by a fixed high frequency carrier wave modulated inversely in amplitude by said electrical signal corresponding to the intensity of light in an image to be projected to modulate the amplitude of the diffraction grating in accordance with the amplitude of said signal, the properties of the fluid being such that the time of the rise and fall of deformations due to the differential charge on said media is comparable to a field of scan, a light and optical system for projecting light as a function of the deformations in said fluid layer.

References Cited

UNITED STATES PATENTS

| | | | |
|---|---|---|---|
| 3,078,338 | 2/1963 | Glenn | 178—5.4 |
| 3,272,917 | 9/1766 | Good et al. | 178—5.4 |
| 3,290,436 | 12/1966 | Good et al. | 178—5.4 |
| 3,325,592 | 6/1967 | Good et al. | 178—5.4 |

ROBERT L. GRIFFIN, *Primary Examiner.*

S. SHEINBEIN, *Assistant Examiner.*